United States Patent [19]

Verlinden et al.

[11] Patent Number: 6,092,392

[45] Date of Patent: Jul. 25, 2000

[54] PROCESS FOR PRODUCING THIN GLASS ON ROLL

[75] Inventors: Bartholomeus Verlinden, Tongeren; Pascale Steenhoudt, Arquennes, both of Belgium

[73] Assignee: AGFA-Gevaert, N.V., Mortsel, Belgium

[21] Appl. No.: 09/069,940

[22] Filed: Apr. 30, 1998

[30] Foreign Application Priority Data

Apr. 30, 1997 [EP] European Pat. Off. .............. 97201255
Oct. 7, 1997 [EP] European Pat. Off. .............. 97203114

[51] Int. Cl.$^7$ ........................... C03C 15/00; C03B 13/00; C03B 13/10; C03B 13/12; C03B 15/02

[52] U.S. Cl. ........................... 65/30.1; 65/30.14; 65/32.5; 65/95; 65/99.2; 65/148; 65/185; 65/193; 65/198

[58] Field of Search ................................. 65/30.1, 30.14, 65/32.5, 90, 95, 99.2, 148, 185, 193, 198

[56] References Cited

U.S. PATENT DOCUMENTS

| | | |
|---|---|---|
| 3,505,047 | 4/1970 | Plumat . |
| 4,846,868 | 7/1989 | Aratani ................................... 65/30.14 |
| 5,277,946 | 1/1994 | Nagai et al. . |
| 5,871,879 | 2/1999 | Verlinden et al. ...................... 430/155 |
| 5,916,656 | 6/1999 | Kitayama et al. ...................... 428/64.1 |

FOREIGN PATENT DOCUMENTS

| | | |
|---|---|---|
| 0 286 018 | 10/1988 | European Pat. Off. . |
| 0 716 339 | 6/1996 | European Pat. Off. . |

OTHER PUBLICATIONS

Derwent Abstract re JP 56 041 859 A (Teijin Ltd), Apr. 18, 1981.

Derwent Abstract re JP 49 010 807 B (Nippon Sheet Glass Co), Mar. 13, 1974.

*Primary Examiner*—Stanley S. Silverman
*Assistant Examiner*—Jacqueline A Ruller
*Attorney, Agent, or Firm*—Breiner & Breiner

[57] ABSTRACT

This invention relates to a continuous process for producing a web of thin, chemically hardened glass that can be wound on a roll. The process comprises the steps of (i) drawing glass, containing original alkali ions, to form a web of glass having a thickness equal to or lower than 1.2 mm and having a first and second major surface; (ii) directly after or during said drawing, treating both said surfaces of said web with chemical hardening means during less than two hours, replacing said original alkali ions by alkali ions having a larger radius; and (iii) after treating both said surfaces, winding said web on a core.

9 Claims, No Drawings

PROCESS FOR PRODUCING THIN GLASS ON ROLL

1. FIELD OF THE INVENTION

This invention relates to a continuous process for producing a web of thin, chemically hardened glass that can be wound on a roll.

2. BACKGROUND OF THE INVENTION

Materials having a high dimensional and/or thermal stability are required in many applications. Though plastic films consisting of organic polymers can be used as support for carrying a functional layer such as an image recording layer, several applications require the use of glass as dimensionally stable support for carrying said functional layer. Known examples thereof are graphic arts applications and photomasks for the manufacture of printed circuit boards. Another advantage of glass compared to plastic supports is the ease of recycling. An example of an application where high thermal stability is needed is the manufacture of colour filters in liquid crystal displays (LCD's), wherein glass plates are used as support in spite of the higher specific weight of glass compared to plastic supports. Due to the low flexibility of glass, the coating with a functional layer is typically carried out in a batch process (sheet by sheet), whereas the coating of a plastic support is generally performed as a continuous process, e.g. using a web coater.

EP-A 716 339 describes a process for providing a flexible glass support with a functional layer in a continuous coating machine, characterised in that (i) the thickness of the glass support is lower than 1.2 mm and (ii) the glass support has a failure stress (under tensile stress) equal to or higher than $1 \times 10^7$ Pa and an elasticity modulus (Young's modulus) equal to or lower than $1 \times 10^{11}$ Pa. The glass disclosed in the latter EP-A is quite brittle. Such glass is therefore not well suited for being wound on a core (e.g. after manufacturing the thin glass) or to be unwound from said core (e.g. for providing the thin glass support with a functional layer in a web coater) because the probability of glass fracture is high.

Chemically strengthened float glass is known to have greater strength than regular float glass. Chemically strengthened glass is glass wherein at both surface layers the original alkali ions are at least partially replaced by alkali ions having a larger radius. Known methods for producing chemically strengthened glass are typically batch processes wherein glass sheets are exposed to ion exchange conditions as described in e.g. JP-A 56 041 859, GB 1 208 153 and U.S. Pat. No. 3,639,198. Batch processes are characterised by a low productivity and therefore not attractive for application on an industrial scale. As the chemical strengthening of glass sheets is typically carried out by immersing the sheets in a salt bath at high temperature, it is difficult to obtain a uniform degree of ion exchange over the whole surface of the sheet.

Typical glass plates used in flat panel displays such as LCD's have a thickness of about 1.1 mm. A glass substrate having a size of 360×465×1 mm wheighs about 500 g and two of such sheets are needed in one LCD. The screen yield is inversely dependent on the thickness of the glass substrate due to the above mentioned risk of glass fracture. As the screen size of flat panel displays as well as the market penetration of portable devices containing a flat panel display is rapidly increasing, there is a need for a thin, strong glass substrate, which may be provided with functional layers and electronic components used in such displays.

3. SUMMARY OF THE INVENTION

It is an object of the invention to provide a process for producing glass on roll that is suitable for implementation on an industrial scale.

More specifically, it is an object of the present invention to provide a method for making a web of a thin glass support that is flexible and strong enough to be wound around a core and/or unwound from said core with a low probability of fracture.

It is another specific object of the present invention to provide the above method as a continuous process characterised by a high productivity and good uniformity of said flexibility and strength in the web.

According to the present invention the above objects are realised by a continuous process for producing glass on roll which comprises the steps of i) drawing glass, containing original alkali ions, to form a web of glass having a thickness equal to or lower than 1.2 mm and having a first and second major surface; and ii) directly after or during said drawing, treating both said surfaces of said web with chemical hardening means during less than two hours, replacing said original alkali ions by alkali ions having a larger radius; and iii) after treating both said surfaces, winding said web on a core.

It is also an objective of the present invention to provide materials characterised by an improved dimensional and thermal stability. It is still another object of the present invention to provide materials having a strong, thin glass support characterised by a lower weight as the known glass sheets. These objects are realised by a material comprising as support the thin glass obtained by the above method and further comprising a functional layer.

Further objects and advantages of the invention will become clear from the detailed description hereinafter.

4. DETAILED DESCRIPTION OF THE INVENTION

Chemical strengthening, also called hardening of glass is a well known procedure for increasing the strength of glass. Chemically hardened glass is glass wherein at both surface layers the original alkali ions are, at least partially, substituted by alkali ions having a larger radius. In chemically hardened sodium lime silica glass, the sodium ions near the surface of the glass are at least partially substituted by potassium and in chemically hardened lithium lime silica glass, the lithium ions near the surface are at least partially substituted by sodium and/or potassium. More details about chemical strengthening of glass are i.a. given in "Glass Technology", Vol. 6, No. 3, page 90–97, June 1965.

Prior art methods for chemical hardening are typically batch processes wherein glass sheets are dipped in a tank containing a molten salt such as potassium nitrate. It is generally understood that such hardening conditions are unfavourable for achieving a homogeneous ion exchange at the whole surface of the sheet. Local fluctuations of concentration and temperature and flows caused by convection or by the movement of the sheet itself disturb the homogeneity of the reaction conditions at the boundary layer between the surface of the sheet and the chemical hardening medium. This is a well known problem associated with all chemical reactions between agents in a different state of aggregation. Inhomogeneous hardening results in a low failure stress of the glass, since even a microscopically small area characterised by a low ion exchange degree acts as a "weak spot" where a crack may originate easily upon application of a tensile load on the sheet. Some measures to improve the homogeneity of the hardening process have been described, e.g. applying electric fields or ultrasonic waves, but are still insufficient.

The chemical hardening process may be monitored by measuring the tensile strength of the glass at various time intervals of treatment with chemical hardening means. The method of DIN no. 52300-5 (=EN 1288-5) uses a gradually increasing tensile force applied upon the surface of a glass sheet and the tensile strength of the glass may be calculated from the maximum force that is applied at the moment of glass fracture. This maximum force corresponds to the term "failure stress" as used herein. The mean tensile strength $\sigma max$, obtained by measuring a significant number of sheets as described above, increases proportionally with the time of chemical hardening. However, when the hardening process is not homogeneous, also the standard deviation of these means $S(\sigma max)$ increases substantially, because some sheets have "weak spots" as described above and may fracture at a lower tensile force than others. So the increase of $\sigma max$ upon chemical hardening may be characterised by a low significance (i.e. $\sigma max - 3*S(\sigma max)$ being low or even close to zero). These phenomena may explain why flexible glass sheets, after being chemically hardened in a batch process, still show a high probability of fracture when being wound around a small core.

Moreover, prior art methods of chemical hardening are carried out off-line, i.e. after cutting the glass in sheets. The time lapse between drawing the glass and chemical hardening should preferably be kept short in order to avoid the propagation of small imperfections in the glass which may deteriorate the strength of the glass.

The above problems are solved by the continuous process of the present invention which comprises the steps of i) drawing glass, containing original alkali ions, to form a web of glass having a thickness equal to or lower than 1.2 mm and having a first and second major surface; and ii) directly after or during said drawing, treating both said surfaces of said web with chemical hardening means during less than two hours, replacing said original alkali ions by alkali ions having a larger radius; and iii) after treating both said surfaces, winding said web on a core.

According to the present invention, a thin flexible glass web is chemically hardened on-line, just after or during the drawing of the glass. The inventors of the present application have established that the chemical hardening can be performed in a continuous process and in a very short time if the thickness of the glass is lower than 1.2 mm. On-line chemical hardening is only feasible when the glass web has a low thickness, thus requiring only a limited amount of hardening time. As the thin glass web is fed through the chemical hardening medium in a continuous process, stationary and homogeneous ion exchange conditions are established which result in a significant increase of the failure stress of the glass. The glass produced in the process of this invention is preferably characterised by a failure stress (under tensile stress) equal to or higher than $5 \times 10^7$ Pa and an elasticity modulus (Young's modulus) equal to or lower than $1 \times 10^{11}$ Pa. "Continuous" shall be understood herein as being related to a web, i.e. the chemical hardening treatment proceeds on-line during or directly after the drawing of the glass and before cutting the glass into sheets or plates.

The thin, chemically strengthened glass web, which is obtained by the method of the present invention, combines the advantage of low weight, high thermal stability and mechanical strength with the capacity of being wound on a small core with a much lower risk of fracture than thin glass sheets which are chemically hardened in a batch process. Said core may have a diameter between 0.05 and 1 m. Preferably the chemical hardening treatment proceeds after the drawing of the glass. The chemical hardening treatment may be shorter than an hour and even shorter than half an hour with satisfying results. The optimal treatment time is determined by the thickness of the glass web and by the thickness of the chemically strengthened layer. The glass web has a thickness equal to or lower than 1.2 mm, preferably equal to or lower than 800 $\mu$m, more preferably equal to or lower than 500 $\mu$m and most preferably between 50 and 300 $\mu$m. The thickness of the chemically strengthened layer is defined herein as the thickness of the layer at the surface of each side of the web wherein the ion substitution degree is at least 25%. The thickness of the chemically strengthened layer is preferably less than one quarter of the total thickness of the original glass, more preferably less than 30 $\mu$m, and most preferably less than 15 $\mu$m. Thus only the outer part of the surface of the glass web is substituted and the inner part of the glass web, which is not substituted, remains (by far) the main part.

The method of drawing a glass web is well known in the art. Typically, the glass web obtained after the drawing has thick borders due to the stretching procedure while floating on a tin bed. These borders are normally cut off and then rounded. In the method of the present invention the borders are preferably cut and rounded before the chemical hardening treatment. Said rounded borders preferably have a radius in the order of magnitude of half of the thickness of the glass web. The tin content in float glass is normally asymmetric, being higher on one surface than the other. Before chemical hardening, this tin asymmetry is preferably removed by the known procedures.

The glass obtained by the method of the present invention may be used as support for carrying one or more functional layer(s) on one or on both sides, e.g. in image recording materials, receiving materials in non-impact printing, as support for colour filters or conductive layers in flat panel displays such as LCD's, etc. Since the glass on roll is flexible as well as mechanically strong, it may be unwound from its core without breaking and can be provided with a functional layer in a continuous process, e.g. by using a web coater. "Continuous" coating refers to the coating of a layer on a support in web-form, contrary to the coating of individual sheets. After coating and drying the coated glass can be cut into sheet materials or may be kept in roll form.

EP-A 716 339 discloses a method for continuously coating glass on roll with a functional layer. The coating can proceed by sputtering, as disclosed e.g. in WO 87/00982, by physical vapour deposition, by chemical vapour deposition, by lamination of a functional layer (optionally using an adhesive layer) via a material comprising said functional layer on a temporary support as well as by coating from a liquid coating solution by dip coating, rod coating, blade coating, air knife coating, gravure coating, reverse roll coating, extrusion coating, slide coating and curtain coating. An overview of these coating techniques can be found in "Modern Coating and Drying Technology", Edward Cohen and Edgar B. Gutoff Editors, VCH publishers, Inc, New York, N.Y., 1992. A plurality of layers may be coated simultaneously on glass on roll produced by the process of this invention, e.g. by coatings technique such as slide coating or curtain coating.

Before coating the functional layer, the surface on one or both sides of the rolled glass can be pre-treated, e.g. can be etched or pre-coated with a subbing layer for a good adherence to the functional layer. Particularly suitable subbing layers for said purpose are on the basis of silicon containing compounds, e.g. those described in U.S. Pat. No. 3,661,584 and GB 1 286 467. Said compounds may also be added to the coating composition of the functional layer. Glass produced in a process according to this invention, can further be coated with a silicate sol/gel coat having preferably a thickness below 100 μm, more preferably a thickness below 20 μm. Said sol/gel coat is preferably sodium free, such as a boro silicate sol/gel coat, especially when the glass obtained by the present invention is used for LCD application, e.g. for being provided with an indium-tin oxide (ITO) layer.

A preferred example of a functional layer which may be coated on the glass, obtained by the method of the present invention, is an image recording layer such as a light sensitive or heat sensitive layer. The glass support of the present invention is especially suited for use in image recording materials which require high dimensional stability, e.g. for graphic image-setting or for producing printing plates, such as lithographic pre-sensitised plates, monosheet diffusion transfer reversal (DTR) plates, driographic plates, thermal plates, etc. The light-sensitive compositions of pre-sensitised plates typically contain diazo compounds and can roughly be divided in negative-working types and positive-working types. The negative-working compositions comprise light-sensitive diazo compounds and preferably polymeric compounds. As the diazo compounds used in a positive-working composition, any compounds conventionally known may be utilised and typical examples thereof are o-quinonediazides and preferably o-naphthoquinonediazide compounds. These o-quinonediazide compounds may be used alone, but are preferably used as a mixture with an alkali-soluble resin to form a light-sensitive layer.

Typical examples of light sensitive materials, which may comprise glass obtained by the present invention as a supporting layer, are silver halide photographic materials consisting of at least one aqueous hydrophilic layer containing silver halide crystals. The composition of silver halide emulsion layers and auxiliary layers is described in e.g. Research Disclosure no. 17643 of December 1978 and Research Disclosure no. 307105 of November 1989. Various embodiments of colour photographic materials are described in Research Disclosure no. 308119 of December 1989.

The material comprising the glass obtained by the present invention may further comprise a hydrophilic layer formed of a hydrophilic binder which is cross-linked with an agent such as formaldehyde, glyoxal, polyisocyanate or preferably a hydrolysed tetra-alkylorthosilicate. Further particular examples of suitable cross-linked hydrophilic layers are disclosed in EP-A 601 240, GB 1 419 512, FR 2 300 354, U.S. Pat. No. 3,971,660, U.S. Pat. No. 4,284,705 and EP-A 514 490.

Heat-mode or thermosensitive image recording materials also benefit from having glass obtained by the present invention as a support because of the higher thermal stability compared to plastic supports consisting of organic polymers. Preferred thermosensitive layers require no wet processing so as to obtain dry imaging materials, e.g. DRAW materials (Direct Read After Write), heat-processable materials such as the so-called Dry Silver materials or materials for COM-production (Computer Output on Microfilm) as described in e.g. Journal of Applied Photographic Engineering, Vol. 9, No. 1, p. 12 (February 1983). A survey of metal layers suited for use as image recording layer in DRAW heat-mode recording is given in U.S. Pat. Nos. 4,499,178 and 4,388,400. For the production of optical discs wherein the information is read in reflection mode, a thermosensitive recording layer having low reflectivity may be applied on a relatively high reflective layer such as an aluminium layer.

Thin metal layers are preferably applied by vacuum deposition techniques. In a preferred embodiment of a heat-mode recording material, which comprises glass obtained by the present invention, a thin vacuum deposited layer of bismuth (Bi) is used as the heat-mode recording layer. Bi is characterised by a low toxicity and forms films with ease by vapour deposition under vacuum conditions. Said Bi film may be image-wise ablated or fused into small particles with a low amount of energy. Such a Bi layer is preferably protected against scratches, dust, etc., by a protective layer which may applied by coating from a liquid solution, spraying or by laminating a protective organic resin layer in web form, by means of an adhesive layer and in the same vacuum environment as wherein the Bi layer is vacuum deposited, to said Bi layer as described in EP-B-384 041.

In a further embodiment heat-mode recording is carried out with binderless organic dye layers as described e.g. in the periodical Philips Techn. T. 41, p. 338–346 by D. J. Gravesteijn and J. van der Veen. In still another application the image recording layer is a photochromic layer as described in Chapter 8 of "Imaging Systems", K. I. Jacobson and R. E. Jacobson, Focal press (1976) p. 143 et seq. The image recording layer may also be a photodelamination layer as described in Research Disclosure no. 22202 (October 1982), p. 328–329. Several printing methods may also benefit from the use of glass obtained by the present invention, e.g. as an image receiving layer. Examples of such printing methods are electrophotographic (laser) printing, ink jet, toner jet, dye diffusion transfer, thermal wax printing, flexographic printing and screen printing.

The thin, chemically strengthened glass of the present invention is especially well suited for use in the production of colour flat panel displays comprising multi-colour filters as disclosed in e.g. EP-B 396 824 and EP-A 615 161, In addition to the low weight and high thermal stability, the optical isotropy of glass is another advantage in this application, compared to most polymer films which are optically anisotropic and, as a result, show birefringence. For use as flat panel display colour filter the glass may be coated with at least three silver halide emulsion layers, each being sensitive to light of a different wavelength range.

Also non-imaging layers can be applied to the glass obtained by the present invention. Examples of such layers are adhesive layers, magnetic layers, hard-coat layers, pigment layers, thermo-adhesive layers, UV-absorbing layers, thermoplastic layers, etc. The glass on roll produced by the process of this invention is very well suited as a light weight, thermally stable, transparent support needed in flat panel displays such as LCD's, e.g. for carrying liquid crystal orientation layers or electro-conductive layers such as ITO or as support of electronic components such as thin-film transistors or pixel electrodes. For the application of such electronic components on regular sheet glass, silk screen printing is typically used, but glass on roll enables the use of faster and more reliable printing techniques such as offset printing.

What is claimed is:

1. A continuous process for producing glass on roll comprising the steps of
   i) drawing glass, containing original alkali ions, to form a web of glass having a thickness equal to or lower than 1.2 mm and having a first and second major surface; and ii) directly after or during said drawing, treating both said surfaces of said web with chemical hardening means during a time of less than two hours, replacing said original alkali ions by alkali ions having a larger radius; and iii) after treating both said surfaces, winding said web on a core.

2. A process according to claim 1 wherein said surfaces are treated with said chemical hardening means during a time of less than one hour.

3. A process according to claim 1 wherein said glass has a thickness equal to or lower than 800 $\mu$m.

4. A process according to claim 1 wherein said core has a diameter between 0.05 and 0.80 m.

5. A process according to claim 1 wherein said web consists of sodium lime silica glass and said chemical hardening means are means replacing sodium by potassium.

6. A process according to claim 1 wherein said web consists of lithium lime silica glass and said chemical hardening means are means replacing lithium by sodium and/or potassium.

7. A process according to claim 1 wherein said chemical hardening of said surfaces proceeds over a thickness less than one quarter of the total thickness of the glass web.

8. A process according to claim 1 wherein said glass is further coated with a silicate sol/gel coat having preferably a thickness less than 100 $\mu$m.

9. A process according to claim 1 wherein said glass is characterized by a failure under tensile stress equal to or higher than $5 \times 10^7$ Pa and a Young's modulus value equal to or lower than $1 \times 10^{11}$ Pa.

* * * * *